(12) United States Patent
Bureau et al.

(10) Patent No.: US 6,568,205 B2
(45) Date of Patent: May 27, 2003

(54) AIR-CONDITIONER FOR A MOTOR VEHICLE

(75) Inventors: Cathy Bureau, Stuttgart (DE); Roland Burk, Stuttgart (DE); Gottfried Duerr, Stuttgart (DE); Guenther Feuerecker, Stuttgart (DE); Kurt Molt, Bietigheim-Bissingen (DE); Wolfgang Seewald, Stuttgart (DE); Brigitte Taxis-Reischl, Stuttgart (DE); Marcus Weinbrenner, Stuttgart (DE)

(73) Assignee: Behr GmbH & Co., Stuttgart (DE)

( * ) Notice: Subject to any disclaimer, the term of this patent is extended or adjusted under 35 U.S.C. 154(b) by 0 days.

(21) Appl. No.: 10/024,344

(22) Filed: Dec. 21, 2001

(65) Prior Publication Data

US 2002/0088248 A1 Jul. 11, 2002

(30) Foreign Application Priority Data

| | | |
|---|---|---|
| Jan. 5, 2001 | (DE) | 101 00 252 |
| Sep. 15, 2001 | (DE) | 101 45 658 |
| Sep. 15, 2001 | (DE) | 201 15 273 |
| Oct. 18, 2001 | (DE) | 101 50 896 |

(51) Int. Cl.[7] ............................................. F25B 39/02
(52) U.S. Cl. ..................... 62/515; 62/244; 62/304; 62/467
(58) Field of Search ........................... 62/515, 502, 434, 62/304, 244, 467; 165/10, 168, 104.14

(56) References Cited

U.S. PATENT DOCUMENTS

| | | | | |
|---|---|---|---|---|
| 5,277,038 A | * | 1/1994 | Carr | 62/434 |
| 5,871,041 A | * | 2/1999 | Rafalovich et al. | 165/10 |
| 6,059,016 A | * | 5/2000 | Rafalovich et al. | 165/41 |
| 6,079,481 A | * | 6/2000 | Lowenstein et al. | 165/10 |
| 6,101,830 A | * | 8/2000 | Feuerecker | 62/304 |

FOREIGN PATENT DOCUMENTS

| | | | | |
|---|---|---|---|---|
| EP | 0 995 621 | | 4/2000 | |
| JP | 61-159036 A | * | 7/1986 | 62/434 |
| JP | 1-219466 A | * | 9/1989 | 62/434 |

* cited by examiner

Primary Examiner—Melvin Jones
(74) Attorney, Agent, or Firm—Foley & Lardner

(57) ABSTRACT

The invention relates to an air-conditioner for a motor vehicle having a refrigerant circuit through which a refrigerant flows. The circuit includes a heat exchanger (1) through which the refrigerant circulates. A second internal refrigerant circuit exists in the heat exchanger (1) and operates when the first refrigerant circuit is at a standstill.

12 Claims, 1 Drawing Sheet

AIR-CONDITIONER FOR A MOTOR VEHICLE

CROSS-REFERENCE TO RELATED APPLICATIONS

The right of priority under 35 U.S.C. §119(a) is claimed based on German Patent Applications No. 101 00 252.1, filed Jan. 5, 2001, No. 201 15 273.8, filed Sep. 15, 2001, No. 101 45 658.1, filed Sep. 15, 2001, and No. 101 50 896.4, filed Oct. 18, 2001, the disclosures of which are hereby incorporated by reference. This application is related to U.S. application Ser. No. 10/024,627, filed concurrently herewith, which is also incorporated herein by reference.

BACKGROUND OF THE INVENTION

The present invention relates to an air-conditioner for a motor vehicle and to a heat exchanger, especially an evaporator, suitable for use in an automotive air-conditioner.

Motor vehicle manufacturers are seeking to reduce the fuel consumption of their vehicles. One measure for reducing the fuel consumption is to cut off the engine While being at a temporary standstill, such as when stopping at a traffic light, for example. This temporary engine cut-off is also known as the idle-stop mode. This measure is already used in present-day fuel-saving vehicles, such as the so-called "three-liter" vehicle, for example. In vehicles having the idle-stop operating mode the engine is shut off for approximately 25–30% of the journey time in urban traffic.

This is one reason why such vehicles are not equipped with an air-conditioner. With the engine shut off, the compressor, which is essential to an air-conditioner, cannot be powered, and therefore in the idle-stop mode an air-conditioner cannot provide the necessary refrigeration capacity.

To solve this problem, it is proposed in EP 0 995 621 A2 to use the condensate produced in the cooling of moist air to ice-up the evaporator of the air-conditioner, so that in the idle-stop mode, when the engine is shut off, the air can be cooled by the then melting ice. This method has numerous disadvantages, however. The quantity of water that is present in the air and is needed for icing-up of the evaporator varies as a function of the ambient climatic conditions. Thus, it may happen that with low air humidity there is insufficient condensation water available to ice-up the evaporation. Furthermore, a relatively long period of time is generally needed for icing-up of the evaporator, so that this known air-conditioner can function in idle-stop mode only after a relatively long driving time. Another problem is that the evaporator generally ices-up unevenly, so that the evaporator has some areas that are iced-up and some areas that are not. Furthermore, icing may be so intense that the air can flow through the evaporator only with a high pressure loss, if at all. In any case, the layer of ice produces a pressure loss on the air side, which leads to the need for an increased blower output. Another disadvantage is that bacteria readily settle on moist surfaces and cause unpleasant odors.

SUMMARY OF THE INVENTION

One principal object of the invention is to provide an improved air-conditioner having a heat exchanger, especially an evaporator, which delivers refrigeration capacity even with the compressor shut off.

A further object is to provide an air-conditioner, which ensures air-conditioning of the vehicle under all operating and ambient conditions, including the idle-stop situation.

In accomplishing these and other objects, there has been provided according to one aspect of the present invention an air-conditioner for a motor vehicle, comprising: a primary refrigerant circuit through which a refrigerant circulates, the primary refrigerant circuit including a heat exchanger through which the refrigerant flows, and the heat exchanger including therein a secondary internal refrigerant circuit that operates when the primary refrigerant circuit is at a standstill.

In accordance with another aspect of the invention there has been provided a heat exchanger suitable for use in an air-conditioner of a motor vehicle, comprising: a plurality of passageways for transporting an air-conditioning refrigerant, the passageways having an upper end and a lower end when mounted in a motor vehicle; and a cold store arranged near the upper ends of at least some of the heat exchanger passageways.

Further objects, features and advantages of the present invention will become apparent from the detailed description of preferred embodiments that follows, when considered together with the accompanying figures of drawing.

DETAILED DESCRIPTION OF PREFERRED EMBODIMENTS

According to the invention, an air-conditioner for a motor vehicle having a heat exchanger, especially a plate or flat tube evaporator, is provided. In addition to a first refrigerant circuit, the evaporator includes a second internal refrigerant circuit that operates (on the heat-pipe principle) at least when the first refrigerant circuit is at a standstill. The second, internal circuit is preferably formed inside the heat-transmitting tubes, plates or pipes of the plate or flat-tube evaporator. In this case the second, internal refrigerant circuit is preferably driven by gravity and/or capillary forces consistent with a heat pipe.

Structure for increasing the thermal conductivity is preferably provided in the area of the cold storage medium. This structure preferably comprises, in particular, banks of fins, which are arranged between the pipes, and/or of a porous, very thermally conductive material, which is impregnated with the cold storage medium.

The cold storage, i.e., the area containing the cold storage medium, is arranged in the upper area of the heat exchanger, and the heat exchanger is designed as an evaporator in such a way that the heat transfer tubes are sealed off toward the bottom. As a result, liquid refrigerant draining out of the upper area of the evaporator cannot escape from the evaporator.

The invention is explained in detail below on the basis of exemplary embodiments and with reference to the drawings.

Figure 1:
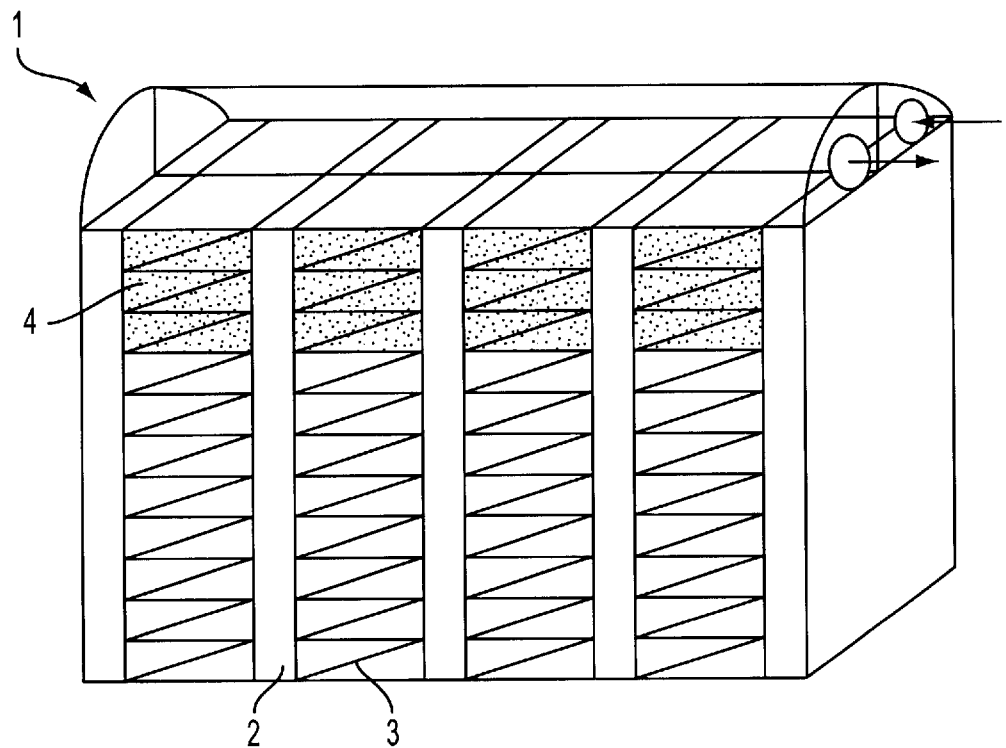
FIG. 1 is a diagrammatic view of a heat exchanger according to the exemplary embodiment of the invention.

Turning now to the drawings, a heat exchanger 1 according to the invention, as is represented diagrammatically in FIG. 1, forms part of a conventional air-conditioner, not shown in further detail. The air-conditioner has a (first) refrigerant circuit, which comprises a compressor driven by the engine of the motor vehicle, a refrigerant condenser, a refrigerant reservoir, an expansion valve and the heat exchanger 1, all of which are linked by pipes. The heat exchanger 1 according to the exemplary embodiment schematically illustrated is a plate evaporator. The partially liquid refrigerant passes into the heat exchanger 1 through an opening in the upper area, as indicated by the corresponding arrow, and makes several passes through the evaporator 1, being deflected laterally and/or vertically, and being partially or completely evaporated. As indicated by the corresponding arrow, the refrigerant leaves the heat exchanger 1 through a further opening as superheated vapor. Air that is to be cooled flows through banks of fins 3 that are provided between the pipes 2.

In the upper area of the heat exchanger 1, an area is provided in which a cold storage medium 4 (latent cold store) is provided adjacent to the heat transfer pipes 2. The terms top and bottom advantageously relate to the alignment in the installed position of the heat exchanger in a vehicle. This area preferably comprises at least one chamber or a plurality of chambers 5. The chambers are preferably arranged between the pipes 2, in an area between the pipes in which the banks of fins are also arranged further down. It is also expedient for these chambers to adjoin the header tank(s) 6 of the heat exchanger. This provides a compact heat exchanger construction. The cold storage medium in the chambers preferably has a melting point in excess of 0° C., particularly one in excess of 3° C. The medium preferably is or contains decanol or tetradecane, so as to permit a phase change of the cold storage medium 4 at a temperature in excess of the icing point of water. This allows the cold storage medium 4 to be solidified without running the risk of icing-up the evaporator.

The heat exchanger 1 functions in the conventional manner with the compressor operating, i.e., when the engine is running. The refrigerant is delivered to the heat exchanger 1 as an expanded, cold vapor/liquid mixture, where it cools the air flowing through the banks of fins as it vaporizes. After compression, it is re-condensed in a known manner in the further course of the first refrigerant circuit. In the heat exchanger 1, the refrigerant also cools the cold storage medium 4 during normal operation, so that the latter is cooled and preferably solidifies.

Figure 2:
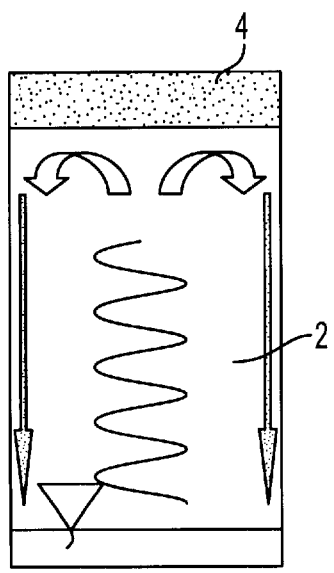
FIG. 2 is a schematic diagram representing the operating mode with shut-off engine.

If the engine is shut off for a brief period, e.g., at a traffic light (idle-stop mode), the compressor driven by the engine stops and, consequently, also the first refrigerant circuit. However, air to be cooled continues to flow through the heat exchanger 1 if, for example, a blower driven by an electric motor continues to deliver the air through the banks of fins. In this case, an internal refrigerant circuit is automatically activated, as is represented diagrammatically for one plate of the heat exchanger 1 in FIG. 2. In this internal circuit, liquid refrigerant flows down the walls of the corresponding pipe 2 for the refrigerant in the heat exchanger 1 under the effect of gravity. In the process of flowing down, the refrigerant partially vaporizes and the residual liquid collects, as indicated at the bottom of FIG. 2, in the lower area of the pipe 2. From the collection point, the refrigerant likewise at least partially vaporizes. The refrigerant vapor, diagrammatically indicated by a wavy line, rises upwardly. Since the first refrigerant circuit is static under these conditions, the vaporous refrigerant cannot be dissipated, but remains in the upper area of the heat exchanger 1, where the pipe 2 adjoins the area or a chamber 5, in which the cold storage medium 4 is contained. The cold storage medium 4 now absorbs the heat of the gaseous refrigerant, so that it re-condenses in this area of the pipe 2 and again flows downwardly. A second internal refrigerant circuit is therefore created that is driven at least in part by gravity.

It is particularly expedient for the chambers 5 to be inserted as prefabricated components into the spaces between the pipes and to be connected to the latter, in order to achieve the best possible heat transfer between the chambers and the pipes. In another embodiment, the chambers can also be solidly connected to the header tank(s) or at least in part integrally formed with the latter. For filling, the chambers 5 have a filling aperture. All chambers can also be centrally filled with a cold storage medium by way of a filling pipe, which is sealed after filling.

In the case of a flat tube evaporator, for example, the second, internal circuit may also be driven or at least assisted by capillary forces, as in a heat pipe, by providing the inner surfaces of the pipes with corresponding capillary structures (not shown) of the type known to produce capillary forces. These capillary structures also serve to improve the wetting of the heat transfer tubes with liquid refrigerant during the normal refrigeration cycle.

The cold storage device is advantageously designed so that it is sufficient for a cooling period of approx. 30 to 300 seconds, preferably from approximately 60 to 90 seconds. Thus, the air-conditioner functions and maintains the cooling capacity even in the case of a brief engine shutoff. In other exemplary embodiments, however, other cooling capacities may be used, which exceed 300 seconds.

The foregoing description of preferred embodiments of the invention has been presented for purposes of illustration and description. It is not intended to be exhaustive or to limit the invention to the precise form disclosed, and modifications and variations are possible and/or would be apparent in light of the above teachings or may be acquired from practice of the invention. The embodiments were chosen and described in order to explain the principles of the invention and its practical application to enable one skilled in the art to utilize the invention in various embodiments and with various modifications as are suited to the particular use contemplated. It is intended that the scope of the invention be defined the claims appended hereto and that the claims encompass the disclosed embodiments and their equivalents.

What is claimed is:

1. An air-conditioner for a motor vehicle, comprising:
    a primary refrigerant circuit through which a refrigerant circulates, the primary refrigerant circuit including a heat exchanger through which the refrigerant flows, and the heat exchanger including therein a secondary internal refrigerant circuit that operates when the primary refrigerant circuit is at a standstill.

2. An air-conditioner for a motor vehicle, comprising:
    a primary refrigerant circuit through which a refrigerant circulates, the primary refrigerant circuit including a heat exchanger through which the refrigerant flows, and the heat exchanger including therein a secondary internal refrigerant circuit that operates when the primary refrigerant circuit is at a standstill, wherein the heat exchanger comprises heat-transfer passageways for the refrigerant and the secondary internal circuit is arranged inside the passageways that comprise tubes, plates or pipes.

3. An air-conditioner as claimed in claim 1, wherein the secondary internal circuit is driven by gravity and/or by capillary forces.

4. An air-conditioner as claimed in claim 2, wherein the secondary circuit comprises a cold store having a cold storage medium in the heat exchanger.

5. An air-conditioner as claimed in claim 4, wherein the cold storage medium has a melting point in excess of 0° C.

6. An air-conditioner as claimed in claim 5, wherein the melting point is in excess of 3° C.

7. An air-conditioner as claimed in claim 4, wherein the cold storage medium comprises decanol or tetradecane.

8. An air-conditioner as claimed in claim 4, further comprising structure for increasing the thermal conductivity in the area of the cold storage medium.

9. An air-conditioner as claimed in claim 8, wherein the structure comprises fins and/or a porous medium for increasing the thermal conductivity between the passageways.

10. A heat exchanger suitable for use in an air-conditioner of a motor vehicle, comprising:

a plurality of passageways for transporting an air-conditioning refrigerant, the passageways having an upper end and a lower end when mounted in a motor vehicle;

a cold store arranged near the upper ends of at least some of the heat exchanger passageways; and a plurality of openings through which air may flow arranged between the lower ends of the passageways.

11. The heat exchanger as claimed in claim 10, wherein the heat exchanger comprises a plate or flat tube evaporator.

12. An air-conditioner as claimed in claim 2, wherein the secondary internal circuit is driven by gravity and/or by capillary forces.

* * * * *